United States Patent [19]
Gille et al.

[11] Patent Number: 5,968,219
[45] Date of Patent: Oct. 19, 1999

[54] BENT GLASS-CERAMIC PLATE AND A METHOD OF MAKING GLASS-CERAMIC BENT PLATE

[75] Inventors: Claude Gille, Bougligny; Michele Marie-Louise Meyer, Avon; Paul Leon Netter, Paris; Sophie Peschiera, Avon; Pablo Juan Luis Vilato Gailloud, Paris, all of France

[73] Assignee: Corning Incorporated, Corning, N.Y.

[21] Appl. No.: 08/987,564

[22] Filed: Dec. 11, 1997

Related U.S. Application Data

[62] Division of application No. 08/541,781, Oct. 10, 1995, abandoned.

[30] Foreign Application Priority Data

Oct. 14, 1994 [FR] France .................................. 94 12302

[51] Int. Cl.⁶ .................................................. C03C 10/12
[52] U.S. Cl. .............................. 65/33.8; 65/33.1; 65/104; 65/106; 264/339; 264/346
[58] Field of Search ........................................ 65/33.1, 33.8, 65/104, 106, 103, 107, 120; 264/339, 346

[56] References Cited

U.S. PATENT DOCUMENTS

| | | | |
|---|---|---|---|
| 3,677,785 | 7/1972 | Horikawa et al. | 106/52 |
| 3,681,043 | 8/1972 | Bognar | 65/33.2 |
| 3,830,216 | 8/1974 | Dodd | 126/39 J |
| 3,832,988 | 9/1974 | Doner | 126/21 |
| 3,834,911 | 9/1974 | Hammel | 65/33.2 |
| 5,070,045 | 12/1991 | Comte et al. | 501/4 |
| 5,244,484 | 9/1993 | Chiba et al. | 65/24 |
| 5,549,100 | 8/1996 | Heisner et al. | 126/39 J |

*Primary Examiner*—Sean Vincent
*Attorney, Agent, or Firm*—Angela Nwaneri; Milton Peterson

[57] ABSTRACT

The invention relates to a method of making glass-ceramic plates which are bent at a radius of curvature especially suitable in the manufacture of cooking plates.

12 Claims, 2 Drawing Sheets

BENT GLASS-CERAMIC PLATE AND A METHOD OF MAKING GLASS-CERAMIC BENT PLATE

This is a division of application Ser. No. 08/541,781, filed Oct. 10, 1995, now abandoned.

BACKGROUND OF THE INVENTION

The invention concerns glass-ceramic bent plates, cooking plates including such a bent plate and a manufacturing procedure for a glass-ceramic bent plate.

Sales of glass-ceramic cooking plates have been growing continually for several years. They essentially consist of a flat glass-ceramic plate fastened to a case containing the electrical equipment, i.e., the heating elements, the regulation system and several electronic control and display devices. The adjustment knobs of the heating elements are often grouped in a control area which may be provided on the glass-ceramic plate itself or on a strip adjacent to the flat glass-ceramic plate.

The tightness and the mechanical connection between the glass-ceramic plate and the case is currently achieved with a joint made of a polymer, preferably silicone. The glass-ceramic plates are generally decorated with enamels. In addition to the esthetic effect sought, the enamels make it possible to indicate the hot areas.

Different heating systems exist and may be associated with the same cooking plate: classic radiating burners consisting of heating resistors, halogen burners consisting of halogen lamps, mixed radiating burners consisting of both preceding elements, gas burners, induction burners consisting of an inductive loop.

Glass-ceramic is made from glass, called a precursor glass, the specific chemical composition of which makes it possible to cause, by means of adapted heat treatment, called ceramming, controlled crystallization. Their partially crystallized structure bestows unique properties on the glass-ceramic. In the course of the ceramming treatments, the following phases are generally observed: a nucleation phase in the course of which the cores on which the crystals will form coalesce, and a crystallization phase in the course of which the crystals form and then grow. The viscosity of the glass diminishes during the initial heating, presents a minimum just before crystallization and then increases under the effect of the crystallization. The nucleation occurs around 700° C. The crystallization in transparent material occurs around 900° C., while that of the opaque material occurs around 1100° C., with opacification starting around 1000° C.

The glass-ceramic plates for cooking plates are usually made up of a lithium aluminum silicate glass-ceramic. This type of glass-ceramic has a very low coefficient of thermal expansion, which allows the plates to resist thermal shocks of several hundred degrees. Among the lithium aluminum silicate glass-ceramics, two main varieties are distinguished: the beta quartz glass-ceramics which may be colored black and which, therefore, may be weakly transparent in the visible range and more or less transparent in the infrared range, and the beta spodumene glass-ceramics which have a whitish appearance, are opaque in the visible range and weakly transparent in the infrared range. Because of their optical properties, the use of beta spodumene glass-ceramics is primarily associated with induction heating. Other colors or optical appearances may be attained from glass-ceramics of different compositions or that have undergone different treatments.

All of the currently marketed glass-ceramic cooking plates include a flat glass-ceramic plate.

For different technical or esthetic reasons, it would be desirable to be able to manufacture glass-ceramic cooking plates including a glass-ceramic plate bent at a slight radius of curvature, i.e., one in which the bend presents a radius of curvature of less than 5 cm and in particular less than 2 cm. The availability of such bent plates would make it possible to remedy certain disadvantages of the current cooking plates, which are linked to the fact that only flat glass-ceramic plates are available.

Thus, in the event that liquid spills over the edge of a cooking utensil, this liquid may spread toward the surface of the plate and on the control area, reach the edges of the plate and finally spill over.

Currently, to prevent the control areas from becoming fouled, certain ones are separated from the cooking areas by a vertical plastic element which has the double disadvantage of resisting heat poorly and, in addition, of being hard to clean while the ease with which the glass-ceramic cooking plates are cleaned is one of their assets.

Likewise, certain glass-ceramic cooking plates have a vertical control strip placed either before or below the level of the glass-ceramic plate, either in back of or over the level of the glass-ceramic plate. This strip is generally made of smoked glass or painted black in back, but does not have an appearance similar to that of the black glass-ceramic, which is to the detriment of the esthetics of the cooking plate. In addition, joints made of a polymer are arranged to ensure the tightness between the glass strip and the glass-ceramic plate. These joints are hard to clean and are areas where wastes collect. Furthermore, they are subject to deterioration because of burns.

Finally, the joint material, when it is applied, often has a tendency to ooze out over the glass-ceramic plate and, despite the cleaning done at the time of assembly, traces may persist on the finished product, which damages the appearance of the cooking plate.

The availability of bent glass-ceramic plates would therefore make it possible to have greater freedom in designing glass-ceramic cooking plates and would make it possible to prevent the disadvantages of the plates currently on the market.

The problem is, however, that it is not known how to bend a glass-ceramic plate with a slight radius of curvature without degrading the plate. Transparent and clear beta quartz glass-ceramic convex plates are well known, but these plates produced by natural subsidence of the precursor glass plate when it undergoes its ceramming heat treatment, present a great radius of curvature, in excess of 10 cm and frequently of the order of one meter. These convex plates are designed to be used as panes in heating devices such as fireplaces, inserts and furnaces and are not suitable for use in cooking plates, inasmuch as their large radius of curvature is a source of loss of room or is excessively bulky. Furthermore, these plates do not present the high level of quality required for cooking plates.

The most common techniques used to produce cambered plates is not suitable for the production of articles having a bend with a slight radius of curvature, inasmuch as the minimum viscosity of the precursor glass reached at the time of the thermal ceramming treatment is too high to allow the formation of such a bend. Furthermore, if an attempt is made to heat locally a plate made of glass-ceramic precursor glass or of glass-ceramic, as is done for a glass plate, in order to bend it, the visual appearance of the plate is strongly degraded at the heated site because of the development of anarchical crystallization, the heterogeneity of which is also a source of tension and fissuring in the plate.

Accordingly, there continues to be a need for new practical and effective methods of forming glass-ceramic articles, having bends of low radii of curvature.

SUMMARY OF THE INVENTION

The present invention is therefore aimed at providing a procedure that makes it possible to produce quality glass-ceramic plates bent at a slight radius of curvature which are especially useful in the manufacture of cooking plates.

More particularly the invention involves a procedure for producing a glass-ceramic plate having at least one bend by:

a) providing a precursor of a glass-ceramic flat plate, b) preheating the plate to a temperature at least 10° C. and preferably 20° C. lower than the nucleation temperature of the glass-ceramic precursor, c) quickly heating an area of the plate to be bent until the viscosity of the glass-ceramic precursor in this area reaches a value appropriate for bending, forming at least one bend with a radius of curvature no greater than 5 cm, the duration of the heating being short enough so as not to cause a significant nucleation of the glass-ceramic precursor, and d) ceramming the bent glass-ceramic precursor plate.

Optionally, the plate may be annealed after bending, and cooled down prior to the ceramming step.

The invention also concerns glass-ceramic plates having at least one bend the radius of curvature of which is less than 5 cm.

The invention finally concerns cooking plates comprising a glass-ceramic plate, characterized by the fact that the aforesaid glass-ceramic plate contains at least one bend, the radius of curvature of which is less than 5 cm.

Preferably, the aforesaid bend has a radius of curvature preferably less than 2 cm, and most preferably in the range of 4 to 12 mm.

DETAILED DESCRIPTION OF THE INVENTION

Figure 1:
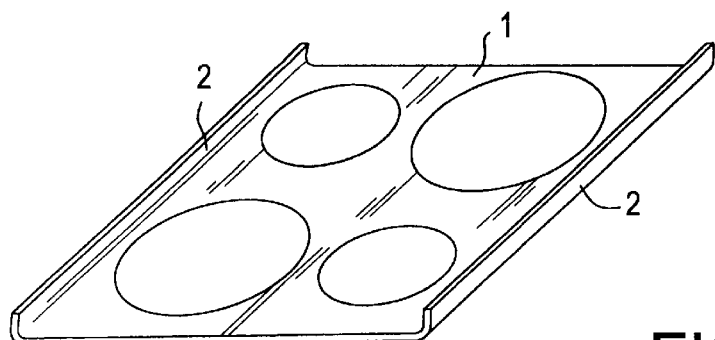
FIGS. 1, 2, 3 and 4 are schematic views of bent glass-ceramic plates, according to the invention.

The flat plate made of glass-ceramic precursor glass, used in step (a) of the present procedure, may be made of any kind of glass-ceramic precursor glass suitable for the application envisaged for the final bent glass-ceramic plate. When the final glass-ceramic plate is to be used in the manufacture of cooking plates, preferably a precursor of lithium aluminum silicate glass-ceramic is used. This type of glass is well known and described, for example, in U.S. Pat. No. 5,070, 045, U.S. Pat. No. 4,835,121, and U.S. Pat. No. 5,212,122, all herein incorporated by reference.

The precursor of the glass-ceramic plate is preheated in a furnace, in step (b), to a temperature lower than the nucleation temperature of the precursor. In one preferred embodiment in which the glass-ceramic is a precursor of lithium aluminum silicate, for which the nucleation temperature is around 700° C., preferred appropriate preheating temperatures will be in the range of about 550 to 680° C. It is usually preferable to maintain the glass-ceramic precursor at the maximum preheating temperature for a certain amount of time, for example, for 10 to 30 min, for the purpose of thoroughly homogenizing the temperature of the plate.

The localized heat of step (c) should be done very quickly so that the length of time it is held at temperatures above the nucleation temperature of the glass does not produce significant nucleation, i.e., nucleation significant enough to generate anarchical crystallization that produces visual or other defects. Where the glass-ceramic flat plate is made from precursors of lithium aluminum silicate glass-ceramics for which the usual length of the nucleation time is of the order of 15 min, it has been found that a length of heating time that does not exceed 1 min, preferably 30 sec, does not produce harmful effects.

In order to achieve fast heating, powerful heating devices must be available, such as gas—$O_2$ or $H_2$—$O_2$ burners, lasers or microwave devices. Nowadays, preference is given to two $H_2$—$O_2$ burners that cover the entire area to be bent, one on each side of the plate.

This fast heating must bring the area of the plate to be bent to a temperature high enough that the viscosity of the glass lends itself to bending the plate. It is estimated that this temperature is in the range of 1000–1500° C. Since it is, however, difficult to read the temperature of the heated area of the plate during this fast heating, it is usually not read, the operators being satisfied with timing the heating after having preliminary routine trials aimed at determining the necessary length of the heating time, under given operating conditions, in order to be able to bend the plate easily.

During the bending of the plate, care must be exercised not to mark or physically damage the plate. To avoid marks and other physical damages during the bending step, any of several well known methods in the glass industry may be used. For example, it is known to use refractory materials coated with a fibrous material to support and/or bend precursor glass plates to avoid surface defects.

It should be noted that the plate to be bent may be enameled before bending, over all or part of its surface, including the bending area.

After having made the bend or bends, the bent precursor-glass plate can be directly cerammed by subjecting it to a ceramming treatment comprising the following steps:

a) raising the temperature of the glass-ceramic plate at the rate of 10–100° C./min up to the glass nucleation temperature, b) crossing the nucleation interval of the glass within a time period generally between 10 min and 1 hr., c) raising of the temperature up to the ceramming temperature, preferably within a period of 10 min to 1 hr., d) holding of the ceramming temperature for generally 15 min to 1 hr., and e) rapidly cooling the glass-ceramic plate down to ambient temperature.

As a variation, the plate of precursor glass may be annealed and then cooled in the classic way, if performing the ceramming subsequently is preferred.

The bending procedure of the invention makes it possible to produce glass-ceramic plates containing one or more bends, arranged according to the desired shape, of which several examples are given below.

The bent glass-ceramic plates of the invention are of a quality comparable to that of flat plates and pass, in particular, the classic mechanical strength tests (shock tests by dropping sauce pans or with the aid of spring-loaded shock device known as a "Norwegian hammer" described in the EN-60335-1 and EN-60335-2-6 standards) and thermal resistance (tests consisting of pouring cold water on the hot plate).

By way of illustration, an example of the embodiment of plate bending according to the invention is given below.

A 4-mm thick 30×25 cm pre-enameled plate made of a precursor glass of lithium aluminum silicate glass-ceramic, with the following composition in percentages by weight on the basis of the oxides:

| | |
|---|---|
| $SiO_2$ | 68.25 |
| $Al_2O_3$ | 19.2 |
| $Li_2O$ | 3.5 |
| $MgO$ | 1.2 |
| $ZnO$ | 1.6 |
| $BaO$ | 0.8 |
| $TiO_2$ | 2.6 |
| $ZrO_2$ | 1.7 |
| $As_2O_3$ | 0.6 |
| $Na_2O + K_2O$ | 0.35 |
| $V_2O_5$ | 0.2% |

It is preheated in a furnace to around 550° C. The preheating lasts 45 min with a temperature of 550° C. held for 20 min to thoroughly homogenize the temperature of the plate. The preheated plate is then removed from the furnace and taken to the bending equipment. The temperature of the plate drops to 400–500° C. during this maneuver. The part of the plate to remain flat is placed on a horizontal support covered with a metal mat with a high degree of thermal conductivity, while the part to be bent projects beyond the support. This support is heated by four radiating burners of the gas/air type. After the plate has been positioned, the area of the plate to be bent is heated in two stages by two $H_2/O_2$ burners arranged above and below the plate, which give off a long, thin flame that extends over the entire length of the bend to be shaped. In the first stage, the area to be bent is heated for around 15 sec by positioning the upper burner 75 mm from the plate and by feeding it with normal flows of $H_2$ and $O_2$ of 4.5 m$^3$/h and 2.1 m$^3$/h, respectively, while the lower burner is placed 150 mm from the plate and fed by normal flows of $H_2$ and $O_2$ of 4.0 m$^3$/h and 2.4 m$^3$/h, respective. Under these conditions, the flames of both burners lick the plate during the first stage of heating. In the second stage, while keeping the feed flows of the burners unchanged, the upper burner is brought to 19 mm from the plate and lower burner to 10 mm of the plate, and they are kept at these distances for around five seconds. With the plate being quite softened in the bending area, the burners are moved back and the plates are bent by mechanical means. Before and at the time of the bending, the plate is kept or held far from the bending area to prevent any marking of the hot glass. The plate is kept in a bent position for several seconds until the glass solidifies sufficiently to maintain the shape. After that, the bent plate is cerammed directly by subjecting it to conventional ceramming heat treatment of the type described above. The resulting bent glass-ceramic plate is free from defects.

The invention will be further described with reference to the drawings.

FIG. 1 shows a plate 1, the side edges 2 of which are bent upwards, for example, to a height of 1 to 2 cm, in order to prevent liquids from spilling over the sides of the plate.

Figure 2:
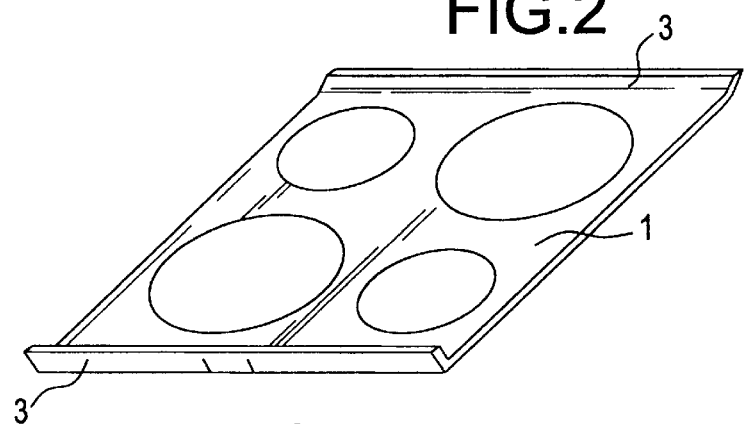

FIG. 2 shows a plate 1, the back and front edges 3 of which are bent upward, for example, to a height of 1 to 2 cm, in order to prevent the liquid from spilling toward the front and back of the plate.

Figure 3:
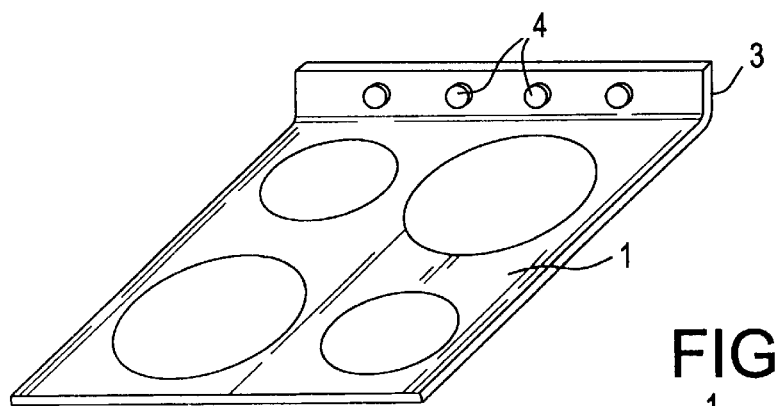

FIG. 3 shows a plate 1, the back part 3 of which has been bent upwards to form a strip with a height of, for example, approximately 10 cm. This strip, pierced with holes 4, is designed to receive the control buttons of the final cooking plate.

Figure 4:
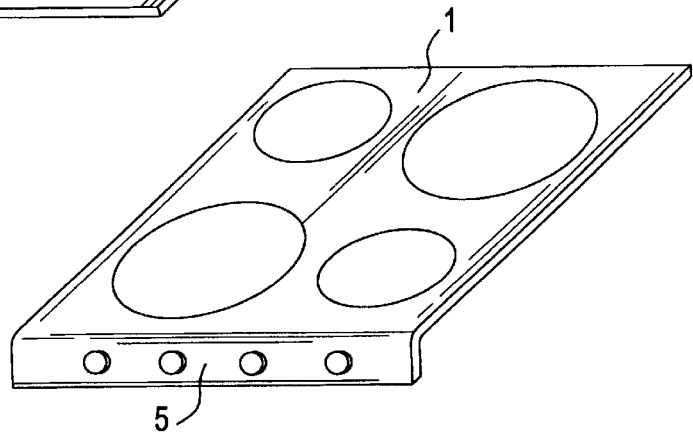

FIG. 4 shows a plate 1, of which the front part 5 has been bent downwards, to form a strip with a height of, for example, approximately 10 cm, the function of which is similar to that of the strip of FIG. 3.

Figure 5:
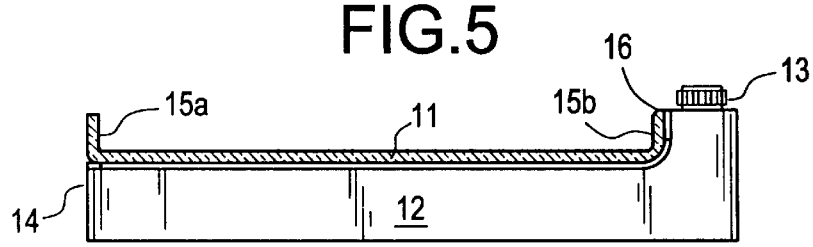
FIGS. 5, 6, 7, 8, 9 and 10 are schematic cross-sectional views that show the cooking plates incorporating different types of bent glass-ceramic plates, according to the invention.

FIG. 5 shows schematically a cooking plate comprising a bent glass-ceramic plate 11, according to the invention, a case 12 equipped with control buttons 13, and joints 14 which provide tightness between the plate and the case. Plate 11 includes the left and right lateral edges 15a and 15b, tucked upward, for example, to a height of 1.5 cm. As represented, the edge 15b may include a bevel 16 in the vicinity of the joint to ensure a better connection between the plate and the joint which prevents any shocks of cooking utensils against the ridge of the plate, as well as improving the esthetics.

Figure 6:
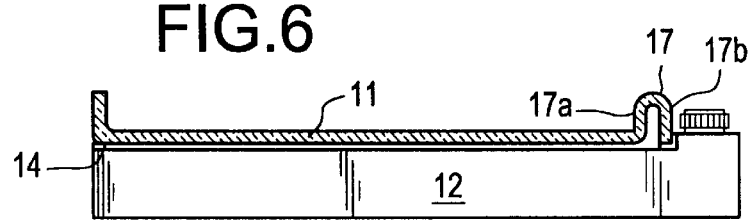

FIG. 6 illustrates a variation of the plate of FIG. 5.

According to this variation, the edge 15b is replaced by a bead edge 17 obtained by making the first bend 17a 90° upward and then the second bend 17b 180° downward with radii of curvature which may be, for example, of the order of 8 mm.

Figure 7:
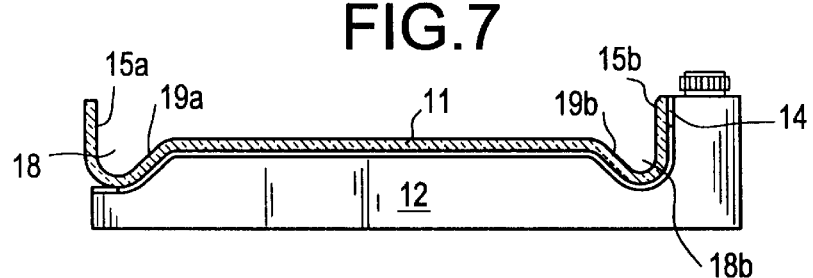

FIG. 7 shows a cooking plate of which the bent glass-ceramic plate 11 is similar to that of FIG. 5, except that the parts contiguous to the edges 15a and 15b form grooves 18a and 18b with regard to the central part of the plate. These grooves 18a and 18b may each be made by making two close bends 19a and 19b in opposite directions and of the same amplitude (for example, 45°) before making the bend of the edges 15a and 15b. The grooves 18a and 18b serve to collect fluids from spills.

Figure 8:
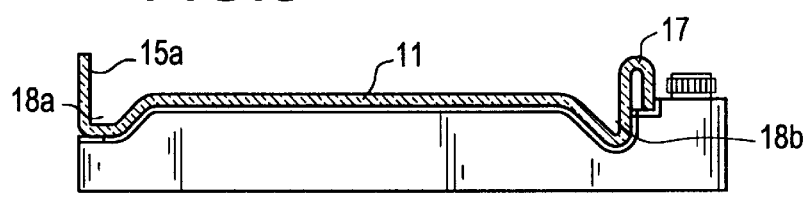

FIG. 8 shows a cooking plate of which the bent glass-ceramic plate 11 is similar to that of FIG. 6, except for the fact that it has grooves 18a and 18b similar to those described about FIG. 7.

Figure 9:
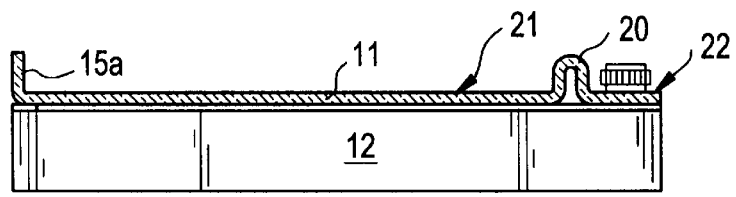

FIG. 9 shows a cooking plate of which the bent glass-ceramic plate includes a left edge 15a tucked upward and a bead edge 20, similar to the bead edge 17, dividing the plate into two areas, one cooking area 21 and one area 22 that receives the plate controls.

Figure 10:
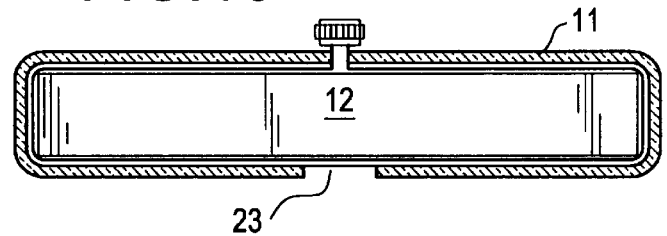

FIG. 10, finally, shows a cooking plate of which the glass-ceramic plate 11 shows the form of a rectangular profile with rounded angles, with a discontinuity 23 on the lower face. One such plate 11 may be obtained from a flat plate by making four 90° bends. The case 12 of the cooking plate may be inserted in this plate by one end of the section. Holes are made in the plate for inserting control buttons.

It is therefore seen by means of the preceding non-limiting examples that making bends of the glass-ceramic plates to be fitted in glass-ceramic cooking plates makes it possible to open the field of creation to new forms with esthetic but also functional advantages, of which one of the main ones is improved ease of cleaning and therefore better hygiene.

We claim:

1. A process for the production of glass-ceramic plate having at least one bend, the process comprising the steps of:

a) providing a precursor of a glass-ceramic flat plate, b) preheating the plate to a temperature lower than the nucleation temperature of the glass-ceramic precursor, c) quickly heating the area of the plate to be bent until the viscosity of the glass-ceramic precursor in said area reaches a value appropriate for bending, forming at least one bend with a radius of curvature less than 5 cm, the duration of the heating being short enough so as not to cause a significant nucleation of the glass-ceramic precursor, and d) ceramming the bent plate.

2. A process according to claim 1, further comprising the steps of annealing the bent plate prior to the ceramming step.

3. A process according to claim 1, wherein the precursor of a glass-ceramic flat plate comprises lithium aluminum silicate.

4. A process according to claim 3, wherein the glass-ceramic precursor is preheated to a temperature in the range of 550–680° C.

5. A process according to claim 1 wherein the duration of the heating in step (c) is at most one minute.

6. A process according to claim 5, wherein the duration of the heating is at most 30 seconds.

7. A process according to claim 1, wherein in step (b), the precursor of the glass-ceramic flat plate is preheated to a temperature which is at most 10° C. below the nucleation temperature of the glass-ceramic precursor.

8. A process according to claim 1, wherein the precursor of glass-ceramic comprises in weight percent based on the oxides, of:

| | |
|---|---|
| $SiO_2$ | 68.25 |
| $Al_2O_3$ | 19.2 |
| $Li_2O$ | 3.5 |

| -continued | |
|---|---|
| MgO | 1.2 |
| ZnO | 1.6 |
| BaO | 0.8 |
| $TiO_2$ | 2.6 |
| $ZrO_2$ | 1.7 |
| $As_2O_3$ | 0.6 |
| $Na_2O + K_2O$ | 0.35 |
| $V_2O_5$ | 0.2% |

9. A process according to claim 1 which comprises preheating the plate at a temperature below the nucleation temperature of the glass for a time sufficient to homogenize the plate temperature.

10. A process according to claim 9 which comprises preheating the plate at a temperature at least about 20° C. below the nucleation temperature for about 10–30 minutes.

11. A process according to claim 1 which comprises locally heating the area of the plate to be bent while supporting and maintaining the remainder of the plate at a lower temperature to avoid bending and marking of that portion of the plate.

12. A process according to claim 11 which comprises locally heating the area of the plate to be bent by directing flames the length of the projected bend on both sides of the plate.

* * * * *